Figures 1, 2:
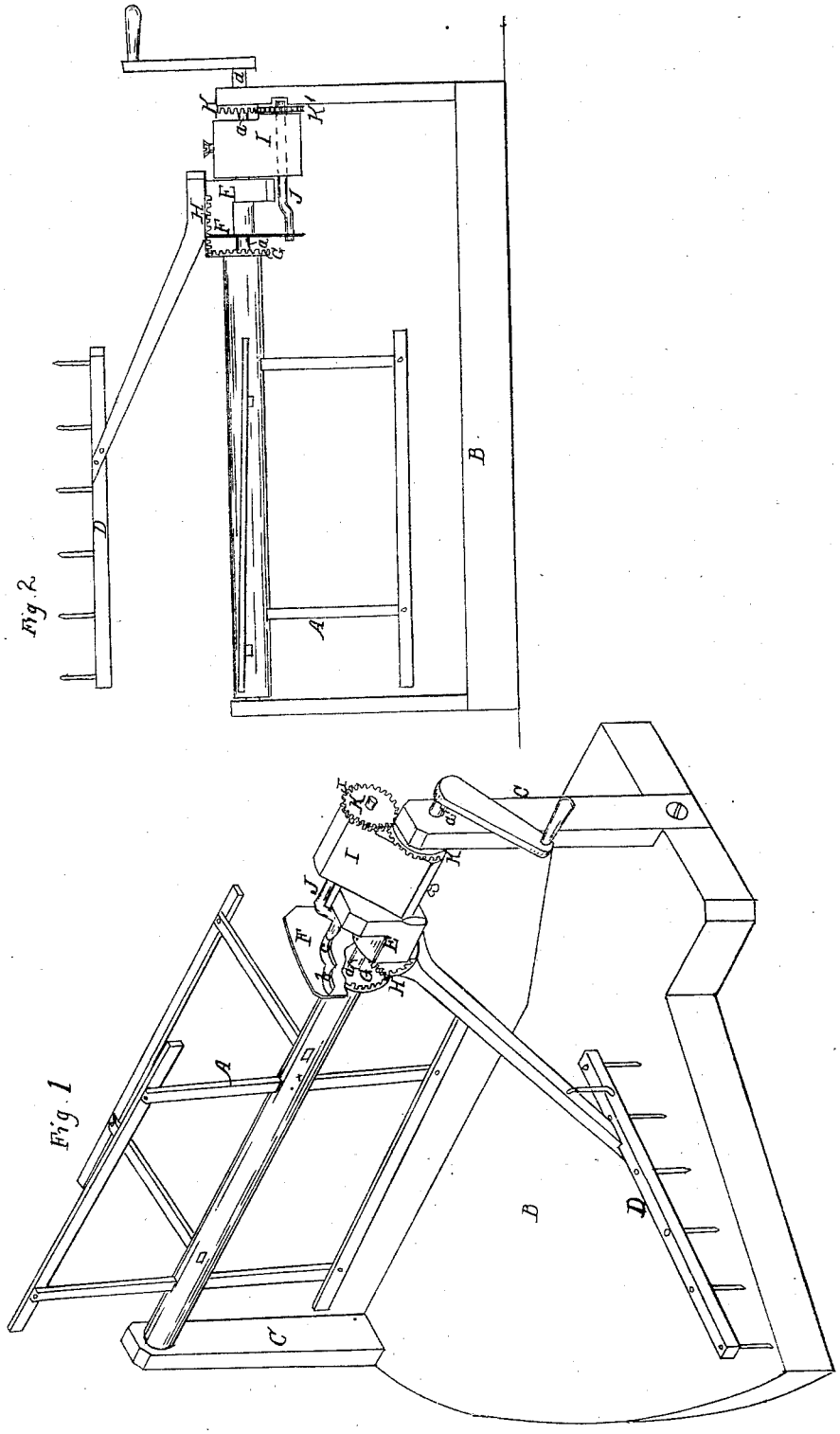

I.S. & H.R. Russell,
Harvester Rake.
No. 23,399. Patented Mar. 29, 1859.

Witnesses
John Farquhar
A.G.D. Rie

Inventors
Isaac S. Russell
Henry R. Russell

UNITED STATES PATENT OFFICE.

ISAAC S. RUSSELL AND HENRY R. RUSSELL, OF NEW MARKET, MARYLAND.

IMPROVEMENT IN HARVESTERS.

Specification forming part of Letters Patent No. 23,399, dated March 29, 1859.

*To all whom it may concern:*

Be it known that we, ISAAC S. RUSSELL and H. R. RUSSELL, of New Market, in the county of Frederick and State of Maryland, have invented a new and useful Improvement in Raking Attachments for Harvesters; and we do hereby declare that the following is a full, clear, and exact description of the same, reference being had to the accompanying drawings, forming a part of this specification, in which—

Figure 1 is a perspective view of a raking attachment constructed after our improved plan. Fig. 2 is a side view of the same.

Similar letters of reference in each of the several figures indicate corresponding parts.

The nature of our invention consists in a peculiar arrangement of mechanism, consisting of two segment bevel-wheels, two spur-wheels, an independently-turning hub having a slotted plate attached to it, and a crank-arm having a turning crank-pin for giving motion to the rake round the reel in the path of a vertical circle and over the platform in the path of a horizontal circle.

To enable others skilled in the art to make and use our invention, we will proceed to describe its construction and operation.

A represents the reel, arranged over the platform B and revolving on standards C C.

D is the rake. It is pivoted to a hub, E, which is arranged to turn loosely on the turned portion $a$ of the shaft of the reel.

F is a plate fitted fast to the hub, so as to turn with it. This plate is furnished with an irregular slot, $b\ c$, as shown.

G H are two bevel segment-wheels. The segment H is fastened firmly on the arm of the rake, while the segment G is fastened firmly on the reel-shaft, as shown. These segments gear with each other and cause the rake, as the main movement is imparted to it by the revolving reel-shaft, to have two auxiliary movements, and thus be thrown into operative position, so as to traverse the platform in the path of a horizontal circle.

I is a crank-arm fitted fast on the part $a$ of the reel-shaft. The pin J of this crank-arm is bent, as shown, and made to play in the irregular slot $b\ c$ of the plate F, said pin revolving free of the crank-arm I.

K K' are two spur-wheels. One of these wheels, K, is arranged fast on the standard C and the other, K', is arranged fast on the outer end of the crank-pin J, and gears into K, as shown.

Operation: The parts being in the position shown in Fig. 1, and the reel set in motion, the grain is caused to fall upon the platform. As the reel advances the arm I, firmly fixed to the reel-shaft, carries with it the spur-wheel K, geared into the spur-wheel K', of the same size, and made stationary by being attached to standard C. This movement gives motion to the crank J, working in the slot $b\ c$, and as the crank revolves in the arm I at the same time that the arm I revolves with the reel the crank-pin, (or the crank proper,) and consequently the plate F and the hub E, which moves freely on the shaft of the reel, must move forward with greater velocity than that of the reel. Then, as the rake-arm rises, the bevel segment-wheel G, attached firmly to the reel-shaft, has a relative retrograde motion, which it communicates to the segment H, attached to the rake-arm D, turning on a pivot on hub E, until the rake-arm assumes a position parallel with the reel-shaft and forms one arm of the reel, as shown in Fig. 2. The crank then moves in the outer portion of the slot, which portion is the segment of a circle whose center coincides with the center of the crank at this stage of the movement, and whose radius is equal to that of the crank and of the two spur-wheels. The rake-arm must now move forward in a vertical circle with the same velocity that the reel has, and it continues to do this until the teeth come to the edge of the platforms. The inner portion of the slot $b\ c$ approximates nearly to that of an epicycloid generated by the revolution of the wheel K about K', and its properties are such that while the crank is traversing it the plate F and hub E are not allowed to advance. Then, owing to the movement of the crank in this part of the curve, the plate and hub are kept stationary, while the segment G communicates its motion to H, carrying the rake-arm uniformly over the platform in the path of a horizontal circle and with such velocity as may be determined by the relative sizes of G and H.

What we claim as our invention, and desire to secure by Letters Patent, is—

The peculiar arrangement of mechanism, consisting of two segment bevel-wheels, G H, two spur-wheels, K K, an independently-turning hub E, having a slotted plate, F, attached to it, and a crank-arm, I, having a turning-crank-pin, J, for giving motion to the rake round the reel in the path of a vertical circle and over the platform in the path of a horizontal circle, substantially as set forth.

ISAAC S. RUSSELL.
HENRY R. RUSSELL.

Witnesses:
JOHN FARQUHAR,
R. G. D. RICE.